Jan. 10, 1961  A. H. VIERGUTZ  2,967,543
FLOW REGULATING VALVE
Filed June 1, 1955
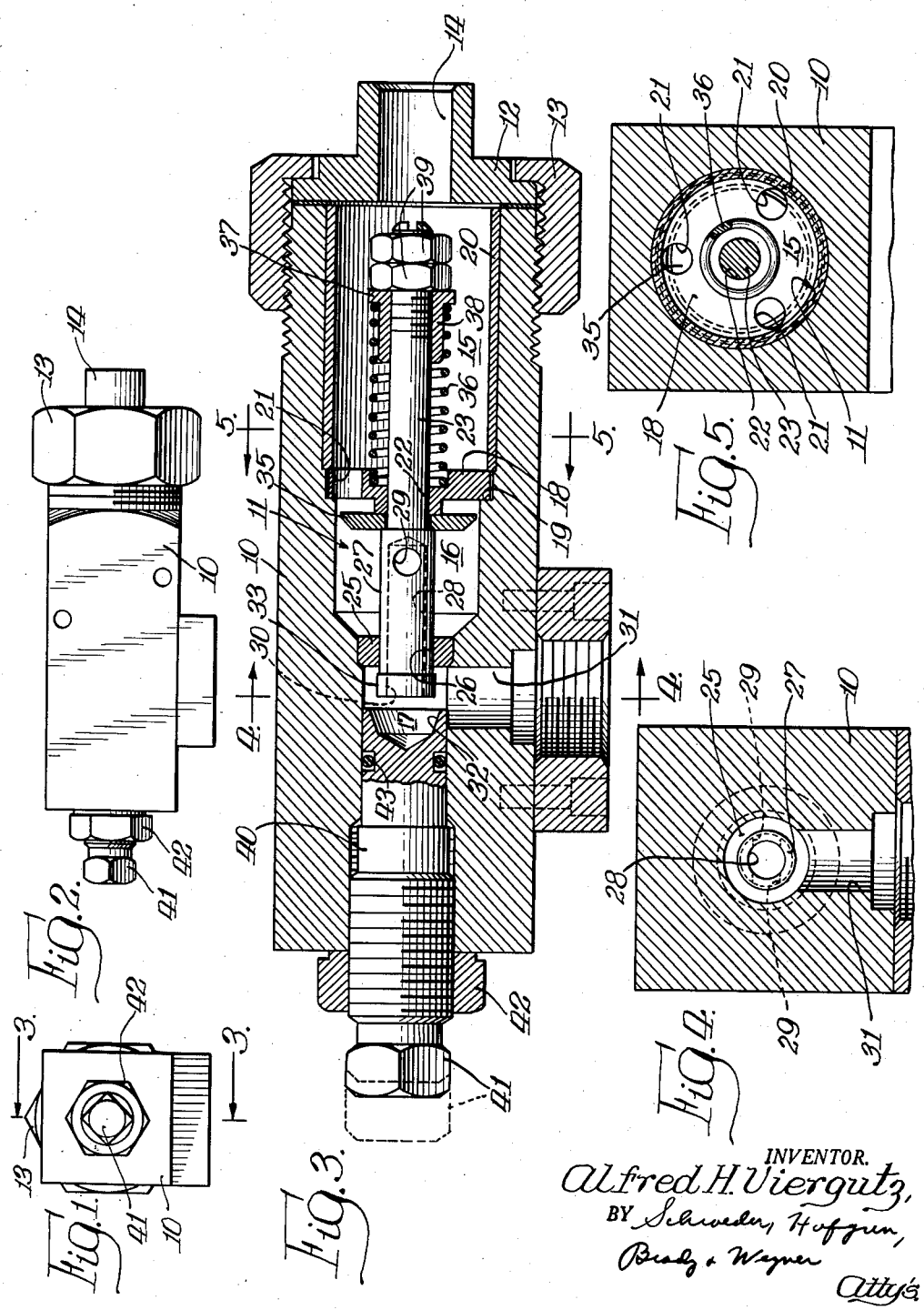
INVENTOR.
Alfred H. Viergutz,
BY Schweder, Hofgren,
Brady & Wegner
Attys.

2,967,543
FLOW REGULATING VALVE

Alfred H. Viergutz, Chicago, Ill., assignor to The W. A. Kates Company, a corporation of Illinois Filed June 1, 1955, Ser. No. 512,538

2 Claims. (Cl. 137—484.2)

This invention relates to a valve device, and more particularly to a valve adapted to permit the flow of a predetermined volume of fluid in spite of wide variations in the pressure of the fluid.

It is the general object of the present invention to produce a new and improved regulating valve of the character described.

It is a more specific object of the invention to provide a flow regulating valve having a movable valving portion controlling flow of fluid through the outlet of the valve and to provide therein means for moving the valving portion in response to fluid flow through the valve thereby to regulate the quantity of fluid permitted to flow through the outlet in spite of changes in the pressure of the fluid.

It is a more specific object of the invention to provide a flow regulating valve including a casing having a passage interconnecting an inlet and an outlet and to provide in said passage a flow regulating valve having an impellor portion subjected to fluid flow through the passage and a valving portion adjacent the outlet and movable by the impellor to control the flow of fluid through the outlet.

Another object of the invention is to provide a valve of the type described in the preceding paragraphs with a spring constantly biasing the valving portion in one direction and to provide said valving portion with an enlarged end adjacent the outlet and positioned to at least partially offset departures from a straight line operation of the valve caused by the characteristics of the spring.

Other and further objects of the invention will be readily apparent from the following description and drawings, in which:

Fig. 1 is an end elevational view of a flow regulating valve embodying the invention;

Fig. 2 is a top plan view of the valve shown in Fig. 1;

Fig. 3 is an enlarged cross sectional view of the valve taken along line 3—3 of Fig. 1;

Fig. 4 is a sectional view taken along line 4—4 of Fig. 3; and,

Fig. 5 is another sectional view taken along line 5—5 of Fig. 3.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, it will be noted that the flow regulating valve of the present invention includes a generally rectangular casing 10 provided with a generally cylindrical passage 11 extending therethrough, a fitting 12 secured to one end of the casing by means of a flanged hexagonal nut 13 is provided with an opening 14 forming an inlet into the passage 11.

Means are provided for dividing the passage 11 into a plurality of sections including an inlet section 15, an impellor section 16 and an outlet section 17. The foregoing means include a disk 18 seated upon a shoulder 19 formed in the casing and held in position by a sleeve 20 pressed into the inlet section of the passage. The disk 18 is provided with three holes 21 to permit fluid flow from the inlet chamber into the impellor chamber and is also provided with a central opening 22 through which a valving member 23 extends. The impellor and outlet sections are separated by a disk 25 having a single opening 26 therein through which a valving portion 27 of the valving member 23 extends. The valving portion 27 is provided with an axially extending hollow 28 communicating at one end with a pair of openings 29 opening into the impellor chamber with the valving portion 27 being open at its other end 30 so as to permit communication between the hollow 28 and the outlet chamber 17.

Extending radially outward from the outlet chamber 17 is an outlet 31 and positioned adjacent the outlet is a valve seat 32 positioned to cooperate with the valving portion 27 and thus control the flow of fluid through the hollow 28 and into the outlet 31. It will be noted that the valving portion 27 is provided with an enlarged end 33 in the outlet chamber, the function of which will be later described.

Secured to the valving member 23 in the impellor chamber 16 is an impellor 35 which is in the form of a disk having an edge slightly spaced from the surrounding side walls of the impellor chamber so that the impellor partially obstructs the flow of fluid through the chamber 16, and thereby creates a pressure differential on opposite sides of the impellor, serving to urge the valving member 23 and its attached valving portion 27 in a direction toward the valve seat 32 to reduce the flow through the outlet 31. Opposing the bias of the impellor is a spring 36 seated at one end against a flange portion 37 formed on a collar 38 surrounding the valving member 23. A pair of nuts 39 permit regulation of the tension of the spring 36 to vary its effect. The opposite end of the spring seats in a recess formed in the disk 18.

The valve seat 32 is in the form of two tapered coaxial recesses formed in the end of a rod 40 threaded as indicated and engaging complementary threads formed in the casing 10. The opposite end of the rod 40 is formed into a hexagonal nut 41 so that the same may be rotated by a suitable wrench and a lock nut 42 is provided for locking the rod 40 in any desired position. Leakage along the rod is prevented by means of an O-ring seal 43. By reason of the foregoing, the location of the valve seat 32 relative to the end of the valving member 27 may be varied, and thus the capacity of the fluid regulating device may be changed as circumstances require.

As the pressure of fluid entering the inlet 14 may increase, increased fluid flow past the impellor 35 increases the pressure differential on opposite sides thereof, thereby moving the valving member and its valving portion against the bias of the spring toward a position throttling the flow into the outlet 31 by proximating the open end 30 of the valving portion and the valve seat 32.

It is recognized that the spring 36 will not have a straight line degree of compressibility, but rather a plot of its resistance to compression would resemble a tangent curve. Thus the more the spring is compressed, the more force is required to compress it further. Means are provided in the fluid regulating device illustrated for compensating at least in part for this characteristic of springs. To this end the enlarged portion 33 is positioned in the outlet chamber generally opposite the outlet 31 so that accelerated fluid flow in the outlet chamber (when the device is operating under high inlet pressure) is across the outer face of the enlarged portion 33. Because of the reduction in pressure resulting from increased velocity of flow, the enlarged portion 33 acts in the nature of a second impellor, urging the valving member and the valving portion toward further movement toward the valve seat 32, and thus in opposition to the spring 36. This action of the enlarged portion 33 is principally manifest under high inlet pressure, under which conditions the spring 36 will be under its greatest compression.

The flow regulating device of the present invention may readily be made of corrosion resistant materials, such as stainless steel, and thus is readily adaptable for use in systems wherein the liquid whose flow is to be regulated is of a corrosive nature. Clearly, while the adjustability of the seat 32 permits adjustment of the device to pass different quantities of fluid regardless of pressure, the seat may be fixed if such adjustability is not desired.

I claim:

1. A flow regulating valve comprising a casing; an elongated generally cylindrical bore in the casing; means in said casing dividing the bore into an inlet section, an outlet section, and an intermediate impellor section; an inlet in the casing opening into said inlet section; an outlet in the casing opening radially into the outlet section; a valving member extending into each of said sections and mounted in said dividing means for movement axially in said bore, said valving member including a cylindrical valving portion positioned in the impellor and outlet sections, said valving portion having an open end in the outlet section, an opening in the impellor section and a passage therein interconnecting the opening and the open end to establish communication between the last mentioned sections through said valving portion; a valve seat in the outlet section positioned in the path of movement of said end of the valving portion; means biasing the valving member toward movement in a direction separating said end of the valving portion from the valve seat; an impellor secured to the valving member in the impellor section of the bore and partially obstructing the flow of fluid therethrough to create a pressure differential on opposite sides of the impellor sufficient to move the valving member toward the valve seat against the bias of the biasing means, and an enlarged generally annular portion formed on said open end and positioned coaxially of the valving portion said enlarged portion being subject to flow of fluid from said outlet section radially outwardly through said outlet and said enlarged portion being positioned adjacent the radial outlet to urge the valving member toward movement in parallel with said impellor.

2. A flow regulating valve comprising a casing having an inlet and an outlet, a passage in the casing interconnecting the inlet and the outlet, a valve seat comprising means defining a recess in the casing adjacent the outlet, a valving member movably mounted in the casing and having a valving portion movable therewith coaxially toward and away from said seat, said valving portion having an opening in communication with the inlet and arranged to direct fluid flow at said valve seat to impinge thereagainst and be redirected thereby in a substantially opposite direction of flow and pass from the passage through said outlet, means biasing the valving member in a direction away from said seat, an impellor connected to the valving member and having a portion positioned in said passage partially to obstruct the flow of fluid therethrough to create a pressure differential on opposite sides of the impellor urging the valving portion toward said valve seat, said valving portion being annularly enlarged at the end thereof adjacent said valve seat, said enlarged portion being subject to the pressure of the fluid redirected by said valve seat to urge the valving member toward said valve seat.

References Cited in the file of this patent

UNITED STATES PATENTS

| Re. 23,487 | McCabe | Apr. 29, 1952 |
| 2,307,949 | Phillips | Jan. 12, 1943 |
| 2,411,392 | Saville | Nov. 19, 1946 |
| 2,472,787 | Brown | June 14, 1949 |
| 2,584,418 | Branson | Feb. 5, 1952 |
| 2,668,555 | Bartolat | Feb. 9, 1954 |
| 2,698,027 | Branson | Dec. 28, 1954 |

FOREIGN PATENTS

| 706,674 | Great Britain | Mar. 31, 1954 |
| 304,232 | Switzerland | Mar. 1, 1955 |